United States Patent
Davis et al.

US006515059B1

(10) Patent No.: US 6,515,059 B1
(45) Date of Patent: *Feb. 4, 2003

(54) UTILIZATION OF DEVULCANIZED EPDM MEMBRANE IN THE MANUFACTURE OF EPDM MEMBRANE, FLASHING AND ROOF ACCESSORIES

(75) Inventors: James A. Davis, Indianapolis, IN (US); Brenda J. Fannin, Indianapolis, IN (US); J. Arvis McKamie, Fishers, IN (US)

(73) Assignee: BFS Diversified Products, LLC, Carmel, IN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 14 days.

(21) Appl. No.: 08/972,232

(22) Filed: Nov. 18, 1997

(51) Int. Cl.$^7$ .............................. C08K 3/26; C08K 3/34
(52) U.S. Cl. ..................... 524/426; 524/445; 524/449; 524/451; 524/476; 524/482; 524/526
(58) Field of Search ................................ 524/526, 426, 524/445, 449, 451, 476, 482

(56) References Cited

U.S. PATENT DOCUMENTS

| | | | |
|---|---|---|---|
| 3,844,668 A | 10/1974 | Winters et al. | 404/72 |
| 3,919,148 A | 11/1975 | Winters et al. | 260/28.5 |
| 4,104,205 A | 8/1978 | Novontny et al. | 260/2.3 |
| 4,400,488 A | * 8/1983 | Lai et al. | 525/211 |
| 4,732,925 A | 3/1988 | Davis | 524/426 |
| 4,771,110 A | 9/1988 | Bauman et al. | 525/131 |
| 5,177,146 A | 1/1993 | Scobbo, Jr. et al. | 525/74 |
| 5,298,210 A | 3/1994 | Heckel et al. | 264/112 |
| 5,527,409 A | 6/1996 | Lanphier | 156/71 |
| 5,672,630 A | * 9/1997 | Mouri et al. | 521/41 |

FOREIGN PATENT DOCUMENTS

JP 932808 2/1997

OTHER PUBLICATIONS

"Yes ACS, There is a Devulcanized Recycled Material", by Joseph M. Duarte, Presented at a meeting of the Rubber Division, American Chemical Society, Cleveland, Ohio, 1997.
"Structural Characterization of Vulcanizates Part X. Thiol–Disulfide Interchange for Cleaving Disulfide Crosslinks in Natural Rubber Vulcanizates" by D. S. Campbell, *Journal of Applied Polymer Science*, vol. 13, pp. 1201–1214, (1969).
"Structural Characterization of Vulcanizates Part X. Thiol–Disulfide Interchange for Cleaving Disulfide Crosslinks in Natural Rubber Vulcanizates" by D. S. Campbell, The Natural rubber Producers' Research Association, Welwyn Garden city, Herts, England.
"A New Dimension in Polymer Composites" Composite Particles, Inc. Brochure, 1994.
"Reinforcing Elastomeric Fillers" by Bernard D. Bauman, for Composite Particles, Inc. Brochure, 1994.
Rubber World article, Eugene Payne, 1994.
Editorial by Don R. Smith, reprinted from *Rubber World*, Apr., 1993.
"PU Incorporating Surface–Modified Particles, Fibers", by Bernard D. Bauman, Tech Service Brochure, Composite Particles, Inc., 1994.
"Surface–Modified Polymer Particles" Bernard D. Bnauman, Composite Particles, Inc. Brochure, 1994.

* cited by examiner

*Primary Examiner*—Peter D. Mulcahy
(74) *Attorney, Agent, or Firm*—Meredith E. Palmer; Rodney L. Skoglund

(57) ABSTRACT

A method of recycling EPDM rubber including the steps of devulcanizing previously cured EPDM rubber and adding the devulcanized EPDM rubber to a composition for forming an elastomeric membrane for roofing, the composition including a rubber mixture including from about 50 to about 95 parts by weight virgin EPDM rubber, and from about 5 to about 50 parts by weight of the devulcanized EPDM rubber, to total one hundred parts by weight rubber, from about 75 to about 300 parts by weight phr of a filler, from about 35 to about 135 parts by weight phr of a processing oil, and a cure package.

25 Claims, No Drawings

UTILIZATION OF DEVULCANIZED EPDM MEMBRANE IN THE MANUFACTURE OF EPDM MEMBRANE, FLASHING AND ROOF ACCESSORIES

TECHNICAL FIELD

This invention relates to a method of recycling scrap EPDM rubber. More particularly, the method of recycling includes incorporating devulcanized EPDM into a rubber composition for forming a rubber sheet material for roofing. The present invention also relates to a rubber sheet material formed from a composition having devulcanized EPDM therein.

BACKGROUND OF THE INVENTION

It is common in the art to employ rubber sheet material to cover rooftops. Typically, these rubber sheet materials are comprised of EPDM rubber, which is a terpolymer of ethylene, propylene and a diene monomer. Also included within such rubber sheet materials is a curative that effects the crosslinking of the EPDM terpolymer and thereby creates a durable protective membrane layer on top of the roof. The EPDM terpolymers have fully saturated backbones, giving excellent resistance to ozone and oxidation.

These protective membranes must be able to withstand severe environmental conditions without the membrane failing. Depending on the geographic location, the EPDM terpolymer membranes must be able to withstand temperatures that can reach up to as high as about 90° C. for prolonged periods of time. Further, these membranes must be able to withstand long exposure to UV light without undergoing chemical degradation. Still further, these membranes must be able to withstand long exposure to ozone without undergoing chemical degradation. In addition to the severe environmental conditions that a membrane must withstand, EPDM membranes must have superior physical durability to withstand the many stresses and strains that are imparted upon a membrane due to the natural shifting of buildings and the like.

Although such EPDM membranes have been found to be advantageous over asphalt based roofing membranes, the life of such membranes typically will not exceed thirty years of use, especially in harsh environmental conditions. The replacement of such EPDM membranes is preferably accomplished by removing the existing membrane from the roof by cutting the membrane in sections, followed by backing out any deck screws and removing the batten cover strips and flashings. If the membrane is on a ballast roof system, the gravel, e.g., river washed stones, must first be removed before cutting the membranes into sections. Further, before the roofing membrane is replaced, wet or degraded insulation boards are typically also replaced.

Because thousands of square feet of EPDM based membranes are used to cover roofs, disposal of scrap EPDM membranes is a problem. It is common to use these scrap rubber membranes as a source of fuel.

Attempts are also made to recycle the material. These recycling techniques include ambiently or cryogenically grinding the cured scrap membrane into finely ground particles and incorporating such particles into new roofing membranes or flashing formulations such as described in U.S. Pat. No. 4,732,925.

It is also known that the sulfur crosslinks formed between EPDM polymer chains can be broken by chemical processes that include the use of peptizing agents or devulcanizing agents, such as Delink® devulcanization process. The sulfur crosslinks can also be broken by mechanical processes such as ultrasonic or microwave treatment.

Although devulcanized EPDM has some "rubber-like" characteristics, and is typically more useful than ambiently or cryogenically ground EPDM, there are several reasons why devulcanized EPDM cannot be used to replace virgin EPDM in all applications. For example, recycled rubber is generally not suitable for use in applications where dynamic performance is needed, such as in tires. Accordingly, attempts thus far to employ devulcanized EPDM have included applications where dynamic properties are not essential, and where minimal reliability is demanded. These applications have included rubber moldings and weather stripping for use in automobile trim, as well as applications including spark plug boot covers, automotive floor mats, splash guards, mud flaps, and head lamp liners.

Although many uses of recycled rubber, especially EPDM, have been found, the supply of scrap rubber is still great because the largest use of rubber is in applications where dynamic performance is highly essential. There is, therefore, a need to find uses for recycled rubber that will not deleteriously impact the product in which devulcanized scrap rubber is incorporated.

SUMMARY OF INVENTION

It is therefore, an object of the present invention to provide a method of recycling used or scrap EPDM membrane.

It is another object of the present invention to provide a roofing membrane that incorporates devulcanized EPDM rubber as part of the overall polymer content present in the EPDM formulation.

It is yet another object of the present invention to provide a novel use for devulcanized EPDM rubber.

At least one or more of the foregoing objects, together with the advantages thereof over the known art relating to roofing membranes, which shall become apparent from the specification that follows, are accomplished by the invention as hereinafter described and claimed.

In general the present invention provides a method of recycling EPDM rubber including the steps of devulcanizing previously cured EPDM rubber, and adding the devulcanized EPDM rubber to a composition for forming an elastomeric membrane for roofing, the composition including a rubber mixture including from about 50 to about 95 parts by weight virgin EPDM rubber, and from about 5 to about 50 parts by weight of the devulcanized EPDM rubber, to total one hundred parts by weight rubber, from about 75 to about 300 parts by weight phr of a filler, from about 35 to about 135 parts by weight phr of a processing oil, and a cure package.

The present invention further includes a method of recycling EPDM rubber comprising the steps of devulcanizing EPDM rubber, and incorporating the devulcanized EPDM rubber into a composition for forming a rubber sheet material for roofing.

The present invention also includes a roof membrane comprising a rubber mixture including from about 50 to about 95 parts by weight virgin EPDM rubber, and from about 5 to about 50 parts by weight of a devulcanized EPDM rubber, to total 100 parts by weight rubber, from about 75 to about 300 parts by weight phr of a filler, from about 35 to about 135 parts by weight phr of a processing oil, and a cure package.

PREFERRED EMBODIMENT FOR CARRYING OUT THE INVENTION

The present invention relates to a method of recycling EPDM by incorporating devulcanized EPDM into a composition for forming a rubber sheet material for roofing. Recovered EPDM polymer is devulcanized and used as a curable replacement for virgin EPDM polymer in EPDM-based formulations. The rubber sheet material that is formed has many of the same physical characteristics as similar rubber sheet materials that employ one hundred percent virgin EPDM.

Devulcanized EPDM, or recovered scrap EPDM as it may be referred to, is recycled by adding the rubber to a composition in order to form a rubber sheet material. This rubber sheet material can be employed in such uses such as roofing membranes and flashing, pipe boot flashing, recovery boards, and walkway pads and runners.

In a preferred embodiment of the present invention, devulcanized EPDM is recycled by adding devulcanized rubber to a composition comprising an EPDM rubber component, a filler, a processing oil, and a sulfur/accelerator cure package. More specifically, the composition comprises of an EPDM rubber component, from about 60 to about 300 parts by weight filler per hundred parts by weight rubber (phr), from about 35 to about 125 parts by weight processing oil phr, and a cure package. Preferably, the composition comprises an EPDM rubber component, from about 75 to about 200 parts by weight filler, from about 50 to about 100 parts by weight processing oil, and a cure package. Still more preferably, the composition comprises an EPDM rubber component, from about 90 to about 175 parts by weight filler phr, from about 65 to about 90 parts by weight processing oil phr, and a cure package.

The EPDM rubber component includes a mixture of at least one virgin EPDM rubber and at least one devulcanized EPDM rubber. Virgin EPDM rubber refers to EPDM rubber that has not been crosslinked such as by sulfur curing, and accordingly, nor has it been devulcanized. Devulcanized EPDM rubber refers to that EPDM rubber that was crosslinked at least once and has been processed so as to cleave or break at least some of the crosslinks that were formed in the rubber during the initial vulcanization or curing process. Devulcanized EPDM rubber will be described in greater detail hereinbelow.

Because the filler, processing oils, and curatives described herein are described with respect to parts by weight per hundred parts by weight rubber, it should be understood that reference to 100 parts rubber refers to 100 parts by weight of both the virgin and devulcanized EPDM rubber, combined.

Generally, the rubber component will include from about 50 to about 95 parts by weight of virgin EPDM rubber and from about 50 to about 5 parts by weight of devulcanized EPDM rubber, to total one hundred parts by weight. Preferably, from about 70 to about 95 parts by weight of virgin EPDM rubber and from about 30 to about 5 parts by weight of devulcanized EPDM rubber, to total one hundred parts by weight. Even more preferably, from about 80 to about 95 parts by weight of virgin EPDM rubber and from about 20 to about 5 parts by weight of devulcanized EPDM rubber, to total one hundred parts by weight.

The term EPDM is used in the sense of its definition as found in ASTM-D-1418-94 and is intended to mean a terpolymer of ethylene, propylene and a diene monomer with the residual unsaturation portion of the diene in the side chain. Illustrative methods for preparing such terpolymers are found in U.S. Pat. No. 3,280,082, the disclosure of which is incorporated herein by reference. The preferred polymers have from about 50 to about 70 weight percent ethylene and from about one to about 10 weight percent diene with the balance of the polymer being propylene or some other similar olefin-type polymer.

It should also be understood that the rubber component of the present invention can include small amounts of EPM rubber, which is an ethylene propylene copolymer. Generally, when EPM is employed it should be included in an amount from no more than about 15 to about 20 parts by weight of the total amount of polymer in the EPDM membrane flashing or roof accessory. Like EPDM, ethylene-propylene copolymers have fully saturated backbones, giving excellent resistance to ozone and oxygen.

Examples of ethylene propylene copolymer include Vistalon 404 and Vistalon 457, both of which are commercially available from the Exxon Chemical Company. The Mooney viscosity ($ML/_4$ at 125° C.) of Vistalon 404 and 457 are 29 and 28, respectively. They also have a glass transition temperatures from about -40° C. to about −60° C. and more preferably from about −45° C. to about −55° C. Ethylene propylene copolymers are without any unsaturation (third monomer) and have excellent long term heat aging and weathering resistance. It should be appreciated, however, that when EPM is employed peroxide cures are typically used.

With respect to the virgin EPDM polymers the diene monomer utilized in forming the EPDM terpolymer is preferably a non-conjugated diene. Illustrative examples of non-conjugated dienes which may be employed are dicyclopentadiene; alkyldicyclopentadiene; 1,4-pentadiene; 1,4-hexadiene; 1,5-hexadiene; 1,4-heptadiene; 2-methyl-1,5-hexadiene; cyclooctadiene; 1,4-octadiene; 1,7-octadiene; 5-ethylidene-2-norbornene; 5-n-propylidene-2-norbornene; 5-(2-methyl-2-butenyl)-2-norbornene and the like. Moreover, the preferred EPDM rubbers have from about one to about 10 weight percent unsaturation.

The preferred virgin EPDM rubbers suitable for use in this invention generally have an ethylene content from about 50 to 70 weight percent and from about one to 10 weight percent diene (third monomer) with the balance of the polymer being propylene or some other similar olefin-type polymer. The viscosity of the preferred EPDM terpolymers should range from about 25 to about 55 Mooney units ($ML/_4$ at 125° C.) and the glass transition temperatures (Tg) from about −40° C. to about −60° C., and more preferably from about 45° C. to about −55° C. In addition, although any EPDM rubber can be used in the polymer blend, preferred EPDM rubbers are amorphous or non-crystalline so as to provide improved processability, especially during the calendering process. Generally, preferred EPDM rubbers include those EPDM's having less than two percent by weight crystallinity as determined by DSC technique. Differential Scanning Calorimeter (DSC) technique is used to measure the emission or consumption of heat accompanying a physical change or a chemical reaction as a function of temperature or time in the temperature range of −150° C. to 725° C. In some instances, blends of major amounts of amorphous EPDM rubbers and minor amounts of crystalline EPDM rubbers may be used and may be preferred in this invention.

Particularly useful and preferred virgin EPDM rubbers are those commercially available from DSM Copolymer of Baton Rouge, La., under the trademark Keltan®; Exxon Chemical Company of Houston, Tex., under the trademark Vistalon®; Uniroyal Chemical Company of Naugatuck, Conn., under the trademark Royalene®, Miles Inc. (Polysar Rubber Division) under the trademark Polysar EPDM®; and E.I. DuPont de Nemours of Wilmington, Del., under the trademark Nordel®. EPDM rubbers that are available from these polymer suppliers are sulfur vulcanizable and have an ethylene content, a polymer viscosity, and a glass transition temperature, as noted hereinabove for preferred EPDMs.

It should also be understood that the virgin EPDM rubber can include copolymers of ethylene and butene. This particular copolymer has about 82 weight percent ethylene with the balance being butene to total 100 weight percent. A typical ethylene/butene copolymer is GERS-1085 (Union Carbide Corporation) having a Mw, as measured by GPC, of at least about 221,000. Other similar olefinic polymers (e.g., ethylene/octene copolymers) can be used to practice this invention. Accordingly, for purposes of discussion herein, references to virgin EPDM rubber is intended to include any of the EPDM, EPM or similar olefinic polymers. As noted hereinabove, it is within the scope of the present invention also to blend low Mooney EPDM terpolymers with the olefinic polymers disclosed herein to reduce the overall viscosity of the membrane, flashing or roof accessory compound.

As generally discussed above, the rubber component includes both virgin EPDM rubber and devulcanized EPDM rubber. The devulcanized EPDM rubber includes EPDM rubber that has been treated, either chemically or without the use of chemicals in an effort to break, some, but not all of the sulfur crosslinks existing from the previous vulcanization or curing process.

Processes for devulcanizing EPDM are well known as discussed hereinabove. In the practice of the present invention, it is preferred that devulcanized EPDM be used that has been processed so as to mechanically break the existing sulfur crosslinks, that connect (bond) one polymer chain to another. By mechanically breaking the sulfur crosslinks, it is meant that techniques such as ultrasonic or microwave energy be used to break the sulfur crosslinks. Those devulcanized or recovered EPDM rubbers that have not undergone chemical treatment to break the sulfur crosslinks are especially preferred for use in the present invention. This preference stems from the fact that when scrap EPDM rubber is chemically treated to break the sulfur crosslinks, the residual chemical additives may negatively influence the rate of crosslinking during the vulcanization process or have a negative influence on the long-term rooftop aging performance of the membrane, flashing or roof accessory materials.

For example, devulcanized EPDM that has been mechanically treated in the absence of chemical additives can be obtained from TRC Industries, Inc. of Stow, Ohio. The TRC process has the flexibility of breaking a small percentage of the sulfur crosslinks, or may achieve up to about 70 or 75 percent breakage of the total number of sulfur crosslinks according to sulfur crosslink density measurements. This devulcanized EPDM rubber is commercially available in crumb or slab form. TRC, Inc. has also developed a process to recover various types of silicone, fluorosilicone and EPDM to create a consistent polymeric raw material for incorporation into the compound of the present invention. Likewise, a similar devulcanized EPDM rubber composition obtained by a chemical devulcanization process is available from obtained from Admark-Advanced Marketing International, Inc., of Wilmington, N.C.

The total concentration of sulfur in a sulfur crosslinked vulcanizate containing natural rubber or synthetic rubbers (i.e., EPDM) can be determined using either the Flory-Rehner equation or Campbell's chemical probes and subsequent swelling measurements. In both test situations, the test sample size ranges between about 0.1 to 0.15 grams. The Flory-Rehner method uses hexane as the swelling medium, while the swelling medium mentioned by Campbell is n-heptane. The specific types of sulfur crosslinks (i.e., mono- di- and polysulfidic) in the sulfur vulcanized network can be more clearly defined using a combination of Campbell's chemical probes and subsequent swelling measurements. This procedure, which was authored by D. S. Campbell, can be found in *Journal of Applied Polymer Chemistry* 13, p. 1201 (1969) and *Rubber Chemical & Technology* 43, p. 210 (1970). The chemical probes are based on 1M hexanethiol in piperidine and 5M 2-propanethiol in n-heptane.

For use in the present invention, the devulcanized EPDM rubber should have at least about 38 percent of the total number of sulfur crosslinks broken. Preferably, the total percentage of sulfur crosslinks that are broken should exceed about 70 percent and even more preferably exceed about 75 to about 80 percent.

Typically, devulcanized or recovered EPDM rubber is obtained as a component of a composition comprising polymer, softeners, carbon black, and mineral fillers. Accordingly, it should be understood that the term devulcanized EPDM rubber will refer to a composition that may include other components in addition to the rubber. As those skilled in the art will appreciate, there are many softeners that are typically employed in rubber compounding, which typically include stearic acid, resins, processing oils, tackifiers, sulfurs, and accelerators. For example, the compositions may include from about 30 to about 35 parts by weight polymer, from about 35 to about 40 parts by weight carbon black, from about 18 to about 25 parts by weight softener, and from about 6 to about 12 parts by weight mineral filler.

In addition to the rubber component, the composition to which the devulcanized EPDM is added also includes fillers, processing oils, and a curative or cure package, all of which are discussed hereinbelow.

With respect first to the mineral fillers, suitable fillers are selected from the group comprising of hard clays, soft clays, chemically modified clays, mica, talc, calcium carbonate, titanium dioxide, amorphous precipitated hydrated silica and mixtures thereof. These fillers may partially replace "black" fillers, i.e., carbon black, and other related petroleum-derived materials.

Often, four basic types of clays are used as reinforcing fillers for rubber elastomers. The different types of clay fillers include those that have been airfloated, water washed, calcined and surface treated or chemically modified.

The airfloated clays are the least expensive and most widely used. They are divided into two general groups, hard and soft, and offer a wide range of reinforcement and loading possibilities. Hard clays are used in the amount of about 25 parts to about 125 parts per 100 parts of polymer phr by weight, preferably in an amount from about 25 to 110 phr. In order to maintain equivalent compound hardness, 1.5 to 1.75 phr hard clay is used to replace 1 phr of carbon black in preparing sulfur cured EPDM roof sheeting. Any commercially available hard clay may be used. The preferred airfloated hard clays used are: Barden R® and LGB®, both commercially available from J.M. Huber Corporation; and Suprex® which is commercially available from Kentucky Tennessee Clay Company, Kaolin Division, Sandersville, Ga.

The airfloated soft clays are used in the amount of about 25 parts to about 125 parts per 100 parts of polymer phr, preferably in an amount of about 65 phr. Again, in order to maintain equivalent compound hardness, 1.5 to 1.75 phr soft clay is used to replace 1 phr of carbon black in preparing sulfur cured EPDM roof sheeting. The preferred airfloated soft clay used is K-78®, which is commercially available from J.M. Huber Corporation; Hi-White R® clay from Evans Clay; and Paragons clay from Kentucky Tennessee Clay Company, Kaolin Division, Sandersville, Ga.

Water washed clays are normally considered as semi-reinforcing fillers. This particular class of clays is more closely controlled for particle size by the water-fractionation process. This process permits the production of clays within controlled particle size ranges. The preferred ranges of water washed clays are very similar to the preferred amounts of airfloated soft clays mentioned hereinabove. Some of the preferred water washed clays include Polyfil® DL, Polyfil® F, Polyfil® FB, Polyfil® HG-90, Polyfil® K and Polyfil® XB, all of which are commercially available from J.M. Huber Corporation.

Another type of clay includes the calcined clay. Clays normally contain approximately 14 percent water of hydration, and most of this can be removed by calcination. The amount of bound water removed determines the degree of calcination. The preferred ranges of calcined clays are very similar to the preferred amounts of airfloated hard clays mentioned hereinabove. Some of the preferred calcined clays include Polyfil® 40, Polyfil® 70, and Polyfil® 80, all commercially available from J.M Huber Corporation.

Still another type of clay includes the chemically modified reinforcing clays. Crosslinking ability is imparted to the clay by modifying the surface of the individual particles with a polyfunctional silane coupling agent. Chemically modified clays are used in the amount of about 25 parts to about 110 parts by weight per 100 parts by weight of polymer, preferably in an amount of about 65 phr. In an effort to achieve equivalent compound hardness, about 1.65 phr of chemically modified clay is used to replace 1 phr carbon black in preparing sulfur cured EPDM roof sheeting. Normally the specific gravity of most clays is about 2.60 at 25° C. The preferred chemically modified clays are commercially available from J.M. Huber Corporation and include: Nucap® 200, Nucap® 190, Nucap® 290, Nulok® 321, Nulok® 390 and Polyfil® 368. Also, Mercap® 100 and Mercap® 200 can be used, which are commercially available from Kentucky Tennessee Clay Company, Kaolin Division, Sandersville, Ga.

Other useful non-black mineral fillers include amorphous silica (silicon dioxide). Silicas are generally classed as wet-process, hydrated silicas because they are produced by a chemical reaction in water, from which they are precipitated as ultrafine, spherical particles. Silica can be employed in the amount of about 20 parts to about 75 parts by weight per 100 parts by weight of polymer, preferably in an amount from about 20 to 50 phr. The useful upper range is limited by the high viscosity imparted by fillers of this type. Some of the commercially available silicas which may be used include: Hi-Sil® 215, Hi-Sil® 233, Hi-Silo 243 LD and Hi-Sil® 190G all produced by PPG Industries. Also, a number of useful commercial grades of different silicas are available from J.M. Huber Corporation, Chemicals Division, Havre de Grace, Md.

Finely ground calcium carbonate can also be employed, preferably in the amount of about 20 parts to about 200 parts per 100 parts of polymer, preferably in an amount from about 35 to 125 phr. In order to maintain equivalent compound hardness the replacement ratio for calcium carbonate to carbon black is about 2:1. Calcium carbonate has a specific gravity of about 2.71 and is commercially available from a number of suppliers including Harwick Chemical, J.M. Huber Corporation, Georgia Marble, Genstar Stone Products and Omya, Inc.

Titanium dioxide can likewise be employed, preferably in the amount of about 5 parts to about 100 parts by weight per 100 parts by weight of polymer, preferably in an amount from about 10 to 60 phr. Both the rutile and anatase form of titanium dioxide may be used, however, the rutile form is preferred and includes such products as TiPure® R-960, which is a fine, white powder having a specific gravity of 3.90 and commercially available from DuPont de Nemours of Wilmington, Del.

Other commercially available non-black mineral fillers that may be employed to practice this invention include; talc (magnesium silicate), mica (mixtures of sodium and potassium aluminum silicate), magnesium hydroxide $Mg(OH)_2$ and alumina trihydrate. Either magnesium hydroxide or alumina trihydrate can also be used as a flame retardant and smoke suppressant in EPDM roof sheeting.

Other suitable fillers are selected from the group consisting of reinforcing materials, and mixtures thereof, as are customarily added to rubber. Examples include such materials as carbon black, ground coal, cryogenically ground rubber and the like. Generally, preferred black-type fillers include carbon black, ground coal and cryogenically ground rubber.

Carbon black can be used, preferably in an amount of about 20 parts to about 150 parts by weight per 100 parts by weight of polymer, preferably in an amount of about 50 to about 110 phr. The preferred range of carbon black herein (50 to 110 phr) is about equal to the amount of carbon black normally used in preparing sulfur cured EPDM roof sheeting. The carbon black useful herein is any conventional carbon black. Preferred are furnace blacks such as GPF (general-purpose furnace), FEF (fast-extrusion furnace) and SRF (semi-reinforcing furnace). Also, small amounts of a reinforcing carbon black, i.e. HAF (high-abrasion furnace), may have utility in this invention.

The ground coal employed as a filler in the compositions of the invention is a dry, finely divided black powder derived from a low volatile bituminous coal. Ground coal has a particle size ranging from a minimum of 0.26 microns to a maximum of 2.55 microns with the average particle size of 0.69±0.46 as determined on 50 individual particles using Transmission Electron Microscopy. The ground coal produces an aqueous slurry having a pH of about 7.0 when tested in accordance with ASTM D-1512. A preferred ground coal of this type is designated Austin Black which has a specific gravity of about 1.255±0.03, an ash content of 4.80 weight % and a sulfur content of 0.75 weight %. Austin Black is commercially available from Coal Fillers, Inc., P.O. Box 1063, Bluefield, Va. Amounts range from about 10 to 35 phr with about 10 to 20 phr being preferred. Use of ground coal is optional and an attendant reduction in the amount of carbon black can be made to compensate.

It should further be understood that essentially any cryogenically ground rubber may be employed as a filler in the composition of the invention. This rubber filler should, of course, be distinguished from the recycled rubber discussed above which has been devulcanized. The preferred cryogenically ground rubbers are cryogenically ground EPDM, butyl, neoprene and the like. A preferred cryogenically ground rubber is a cryogenically ground EPDM rubber. The preferred cryogenically ground EPDM rubber is a fine black rubbery powder having a specific gravity of about 1.160±0.015 and a particle size ranging from about 30 to about 300 microns with an average particle size ranging from about 50 to about 80 microns. Amounts may range from about 5 to 40 phr with about 10 to 25 phr being preferred.

Mixtures of Austin black and cryogenically ground rubber useful herein may be utilized as a partial replacement for carbon black. Where mixtures of these two fillers are employed the relative amounts thereof can be widely varied; the overall total not exceeding about 60 phr. The ratio of Austin black to cryogenically ground rubber may range from a desired ratio of 2:1 to perhaps a ratio of 3:1. Again, as noted hereinabove, other filler materials can be employed. Amounts thereof fall within the range of amounts normally employed in preparing sulfur cured conventional EPDM roof sheeting.

With respect to the processing oil, it is included to improve the processing behavior of the membrane composition; that is, reduce mixing time and increase the calendering throughput rate. The processing oil is included in an amount ranging from about 35 parts to about 135 parts by weight of process oil per 100 parts by weight of polymeric component, preferably in an amount ranging from about 55 parts to about 90 parts by weight. Preferred processing oils are paraffinic oils; e.g., Sunpar 2280 which is available from the Sun Oil Company. Other petroleum derived oils including naphthenic oils may also be used.

Curing of the EPDM rubber component of this invention can be effected by any of the well known curing systems, including sulfur and sulfur-donor cure systems, peroxide cure systems, and quinone-type cure systems. Curing of the EPM rubbers, when used in the compositions of this invention, can generally be effected with a peroxide cure system. Preferably, the cure package includes sulfur and at least one curing rubber accelerator.

The sulfur and sulfur-containing cure systems used in the present invention can include one or more sulfur curing accelerators. Suitable accelerators commonly employed include, for example, thioureas such as ethylene thiourea, N,N-dibutylthiourea, N,N-diethylthiourea and the like; thiuram monosulfides and disulfides such as tetramethylthiuram monosulfide (TMTMS), tetrabutylthiuram disulfide (TBTDS), tetramethylthiuram disulfide (TMTDS), tetraethylthiuram monosulfide (TETMS), dipentamethylenethiuram hexasulfide (DPTH) and the like; benzothiazole sulfenamides such as N-oxydiethylene-2-benzothiazole sulfenamide, N-cyclohexyl-2-benzothiazole sulfenamide, N,N-diisopropyl-2-benzothiazole sulfenamide, N-tert-butyl-2-benzothiazole sulfenamide (TBBS) and the like; 2-mercaptoimidazoline, N,N-diphenylguanidine, N,N-di-(2-methylphenyl)-guanidine, thiazole accelerators such as 2-mercaptobenzothiazole, 2-(morpholinodithio) benzothiazole disulfide, zinc 2-mercaptobenzothiazole and the like; dithiocarbamate accelerators such as tellurium diethyldithiocarbamate, copper di methyldith iocarbamate, bismuth dimethyidithiocarbamate, cadmium diethyldithiocarbamate, lead dimethyldithiocarbamate, zinc dibutyldithiocarbamate zinc diethyldithiocarbamate and zinc dimethyidithiocarbamate.

It should be appreciated that the foregoing list is not exclusive, and that other vulcanizing agents known in the art to be effective in the curing of EPDM terpolymers employed in the polymer blend may also be utilized. For a list of additional vulcanizing agents, see The Vanderbilt Rubber Handbook, RT Vanderbilt Co., Norwalk Conn. 06855 (1990). It should also be understood that these sulfur donor-type accelerators may be used in place of the elemental sulfur or in conjunction therewith. Suitable amounts of sulfur to be used in the cure package can be readily determined by those skilled in the art, and generally ranges from about 0.25 to 2.0 phr, while the amount of accelerator can also be readily determined by those skilled in the art and generally ranges from about 1.5 to about 8 phr.

Accelerators generally require a metal oxide, i.e., zinc oxide, for cure activation in most all types of rubbers. Zinc oxide is almost always the metal oxide of choice because of its effectiveness and lack of toxicity. The amount of zinc oxide may vary, but about 1 to about 10 parts by weight in the formulation have been found to give the desired effect. Also, in order to initiate the vulcanization process, a small amount (generally about 1 to 2 parts by weight) of stearic acid is present in the composition. Using heat, both zinc oxide and stearic acid act as cure activators in the presence of sulfur, one or more accelerators and unsaturated rubber help to promote the formation of sulfur crosslinks during the vulcanization process. Some of the initial chemical reactions which take place during the early stages of the vulcanization process include reacting zinc oxide with stearic acid to form salts of even greater vulcanization activity. Zinc oxide itself acts as a cure activator or vulcanization promoter, speeding the rate of reaction of elemental sulfur with the unsaturation in the diene portion of the ethylene-propylene rubber. In addition to its use as a curing component, the sulfur component of the present invention may also be used in conjunction with zinc oxide to improve the heat aging resistance of the rubber composition.

Sulfur donor-type accelerators may be used in place of elemental sulfur or in conjunction with elemental sulfur if desired. Suitable amounts of sulfur and/or sulfur donor accelerators can be readily determined by those of ordinary skill in the art and generally range from about 1 to about 4 phr. The amounts of a sulfur donor accelerator can also be readily determined by those of ordinary skill in the art and generally range from about 1.5 to about 8 phr. Some examples of sulfur donor accelerators include; dimorpholino disulfide commonly referred to as Sulfasan R and various alkyl phenol disulfides which are commercially available from Pennwalt Corporation.

Examples of suitable peroxides that can be used as curing agents or co-curing agents include alpha-cumyl hydroperoxide, methylethylketone peroxide, hydrogen peroxide, acetylacetone peroxide, t-butyl hydroperoxide, t-butyl peroxybenzoate, 2,5-bis(t-butyl peroxy)-2,5-dimethylhexene, lauryl peroxide, benzoyl peroxide, 2,4-dichlorobenzoyl peroxide, dibenzoyl peroxide, bis(p-monomethylene-benzoyl) peroxide, bis(p-nitrobenzoyl) peroxide, phenylacetyl peroxide, and the like. Suitable amounts of peroxide crosslinking agents can be readily determined by those having ordinary skill in the art and generally range from about 1 to about 6 phr.

Examples of inorganic peroxides which can be used as co-curing agents with p-quinone dioxime include lead peroxide, zinc peroxide, barium peroxide, copper peroxide, potassium peroxide, silver peroxide, sodium peroxide, calcium peroxide, metallic peroxyborates, peroxychromates, peroxydicarbonates, peroxydiphosphates, peroxydisulfates, peroxygermanates, peroxymolybdates, peroxynitrates, magnesium peroxide, sodium pyrophosphate peroxide, and the like.

Examples of polysulfide activators for the quinone-type co-curing agents include calcium polysulfide, sodium polysulfide, as well as organic polysulfides having the general formula R—(S)$_x$—R, wherein R is a hydrocarbon group and x is a number from 2–4. Examples of organic polysulfides are disclosed in U.S. Pat. No. 2,619,481.

Conventional radiation equipment and techniques can also be employed in the practice of this invention. Suitable ionizing crosslinking promoters which can be used include: liquid high-vinyl 1,2-polybutadiene resins containing 90 percent 1,2-vinyl content; Sartomer SR-206 (ethylene glycol dimethacrylate), Di-Cup R (dicumyl peroxide, about 98 percent active), and Pental A (pentaerythritol resin prepared from tall oil). Preferably, these rubber chemical additives can be included in an amount of from about 1.5 to about 20 phr. Such rubber chemical additives should be compatible with the other ingredients in the composition and function to reduce the dosage of ionizing radiation needed to obtain the desired level of crosslinking.

The compositions of this invention can be compounded with various conventional additives as desired, including process and extender oils; processing aids such as various metal salts of stearic acid, mixtures of aromatic resin and fatty acids, sodium dodecyl sulfate as well as tackifying resins, plasticizers, antioxidants, antiozonants, waxes, cure accelerators, zinc oxide, stearic acid, UV stabilizers and the like. Such additives can be utilized in amounts conventionally employed in such rubber compounds.

The membrane compositions of this invention can also be prepared by conventional means using conventional rubber processing equipment such as a Brabender, Banbury, Sigma-blade mixer, two-roll mill, or other mixers suitable for forming viscous, relatively uniform admixtures. Mixing techniques depend on a variety of factors such as the specific types of polymers used, and the fillers, processing oils, waxes and other ingredients used. The ingredients can be added together in a single shot, loaded with the fillers, oils, etc. going in first and the polymer going in last, or in a more conventional manner with the polymer added first, depending on the actual ingredients used.

Mixing cycles generally range from about 3 to 6 minutes. Better mixing is generally attained by an incremental procedure in which part of the fillers are added first with little or no oil, with the remaining fillers and oils being added in additional increments and the polymer being added last. Rapid mixing and good dispersion can also be achieved by first adding part of the EPM or EPDM polymers, followed by the fillers, plasticizers, etc, and lastly the remainder of the EPM or EPDM polymers. This procedure can be further modified by withholding part of the oil which is then added incrementally. The batch drop temperature of the first-stage mix (masterbatch) usually exceeds 150° C.

The cure package (sulfur/accelerator) is typically added in the last stage of a two-stage mix (final). The cure package should be added to the last stage of a two-stage mix at lower temperatures in order to prevent premature crosslinking of the EPDM composition. When utilizing a type B Banbury internal mixer, in a preferred mode, the dry or powdery materials such as the non-black mineral fillers (i.e., untreated clay, treated clays, talc, mica, and the like) and the devulcanized scrap EPDM of the present invention are added to the mixing chamber first, followed by the liquid process oil addition and finally the virgin EPDM polymer (this type of mixing can be referred to as an upside-down mixing technique).

Two-stage mixing can be employed when better filler dispersion is desired. The rubbery composition can then be formed into a sheet via the calendering process. The compositions of the invention can also be formed into various types of articles using other techniques such as roller die extrusion.

The resulting admixture is sheeted to thicknesses ranging from about 5 to 200 mils, preferably-from about 35 to 60 mils by conventional sheeting methods, for example, milling, calendering or extrusion. Preferably,. the admixture is sheeted to about 40 mils (0.040-inches thick) which is the minimum thickness specified in the manufacturing standards established by the Roofing Council of the Rubber Manufacturers Association (RMA) for non-reinforced EPDM rubber sheets used in roofing applications. In many cases, the admixture is sheeted to a thickness of 40–45 mils, since this is the thickness for a large percentage of "single-ply" roofing membranes used commercially. The sheeting can be visually inspected and cut to the desired length and width dimensions after curing.

The present invention also is practiced by utilizing a rubber sheet material, as described herein, to cover a roof. As the sheet is unrolled over the roof substructure in an otherwise conventional fashion, the seams of adjacent sheet layers are overlapped. The width of the seam can vary depending on the requirements specified by the architect, building contractor or roofing contractor and thus, do not constitute a limitation of the present invention.

The overlapping edges of the roofing membranes can be cleaned with soap and water or the appropriate solvent to remove any grease, oil or other contaminants that could interfere with providing adequate adhesion, and/or may be solvent cleaned as desired, to enhance bond formation and increase seam adhesion peel strength. Typical solvents used for cleaning the overlapped edges of the roofing membrane include hexane, heptane, or toluene, however, solvent cleaning is generally not required. Where a bonding adhesive is used, one example suitable for use with this invention is BA-2004, a neoprene-based adhesive commercially available from Firestone Building Products Company and where a lap-splice seam adhesive is used, one example suitable for use with this invention is Firestone's SA-1065, a commercially available butyl-based lap-splice adhesive. Application of the adhesive can be facilitated by spray, brush, swab or other means known in the art.

One of the unexpected properties of the preferred membranes according to the present invention is their ability to retain physical properties after heat aging. Specifically, it has unexpectedly been found that, after about 28 days of aging at about 116° C., the tensile strength has a percent retention of at least about 90 percent, advantageously at least about 95 percent, and even more advantageously above about 100 percent. Also, it has been found that the die C tear resistance, after similar aging, has a percent retention of at least about 90 percent, advantageously at least about 95 percent, and even more advantageously at least about 100 percent. Further, it has been found that the elongation, after similar aging, has a percent retention of at least about 70 percent, advantageously at least about 75 percent, and even more advantageously above about 80 percent.

Another advantageous, unexpected feature of the present invention is the fast cure rate associated with the membranes containing devulcanized EPDM rubber. It has been found that membranes according to the preferred embodiments of the present invention cure within about 90 to 95 percent of the time needed to cure similar membranes not employing devulcanized EPDM rubber. Even more advantageously, it has been found that the membranes according to the preferred embodiment of the present invention cure within about 85 percent of the time needed to cure membranes not utilizing devulcanized EPDM rubber. In addition to an increased rate of cure, it has unexpectedly been found that less sulfur, and less sulfur curing accelerator, is needed within the compositions of the present invention. This reduction in sulfur and sulfur curing accelerator results in both a cost savings and processing efficiency.

In a similar fashion, it has also been found that the use of devulcanized EPDM rubber within the compositions of the present invention allows for a reduction in the amount of processing oil that is typically used in similar compositions that do not employ devulcanized EPDM rubber. This reduction in processing oil likewise provides for cost savings and processing efficiency.

Still further, the use of devulcanized EPDM rubber according to the present invention allows for the use of less filler, especially mineral filler. In other words, it has been found that the use of devulcanized EPDM rubber can be used in lieu of a percentage of the mineral filler. This advantageous material substitution likewise results in a significant cost savings.

In order to demonstrate the practice of the present invention, the following examples have been prepared and tested as described in the Experimental Section disclosed hereinbelow. The examples should not, however, be viewed as limiting the scope of the invention, as the claims will serve to define the invention.

GENERAL EXPERIMENTAL

EXAMPLE I

Five EPDM pipe boot flashing compounds were prepared in a Brabender mixer (300 gram batch size) and sheeted into a rubber test sheet using a 75° C. two-roll mill. The individual ingredients for these compositions are listed in Table I, hereinbelow. Compounds 1–4 are representative of compositions of the present invention. It is here noted that the ingredients are listed in parts by weight throughout the General Experimentation Section.

TABLE I

| | Compound Nos. | | | | |
|---|---|---|---|---|---|
| | Control | 1 | 2 | 3 | 4 |
| Virgin EPDM[a] | 85 | 85 | 85 | 85 | 85 |
| Virgin EPDM[b] | 15 | 10.44 | 9.5 | 5.82 | 0.32 |
| Devulcanized EPDM[c] | | 15 | | | |
| Devulcanized EPDM[d] | | | 15 | 25 | 40 |
| Parts by weight Rubber | 100 | 100 | 100 | 100 | 100 |
| Carbon Black | 110 | 106.3 | 104.9 | 101 | 96 |
| Processing Oil | 80 | 76.4 | 76.8 | 74.7 | 71.6 |
| Zinc Oxide | 5 | 4.8 | 4.8 | 4.8 | 4.8 |
| Stearic acid | 1 | 1 | 1 | 1 | 1 |
| Sulfur Curing Ingredients | 3.1 | 2.95 | 2.95 | 2.95 | 2.95 |
| TOTAL | 299.1 | 301.89 | 299.95 | 300.27 | 301.67 |

[a]Amorphous EPDM
[b]Semi-crystalline EPDM
[c]Devulcanized scrap EPDM (slab form) - spark plug boot cover compound - test material prepared by TRC, Industries, Stow, Ohio.
[d]0801-0001 (slab form) - chemically devulcanized scrap EPDM roofing membrane - test material prepared by ADMARK, Wilmington, North Carolina.

Each of the above EPDM pipe boot flashing compounds was prepared in a Brabender mixer (300 gram batch size) using a two-stage mixing technique. The masterbatch which features the polymer, carbon black, processing oil, zinc oxide and stearic acid were mixed together in the first-stage mix, while the cure package was added to the masterbatch during the second-stage mix. The mix time for each of the second-stage mixed compounds was about 2.5 minutes and the batch drop temperature was about 115° C. The Brabender mixed compound was resheeted using a 75° C. two-roll mill.

The pipe boot flashing compounds were tested for cure characteristics, compound viscosity, processing safety, stress-strain properties, tear resistance, heat aging resistance, and cured compound hardness.

The cure characteristic of each pipe boot flashing composition was determined using a Monsanto Oscillating Disc Rheometer according to ASTM D 2084. The metal die used to measure scorch time, cure rates and state of cure is referred to as a mini-die. During actual testing, the die oscillated at a 3° arc. The test results of are reported in Table II, hereinbelow.

TABLE II

Rheometer at 160° C., mini-die, 3° Arc

| | Compound Nos. | | | | |
|---|---|---|---|---|---|
| | Control | 1 | 2 | 3 | 4 |
| $T_{50}$ (minutes:seconds) | 7.21 | 7.4 | 6.24 | 6.36 | 5.56 |
| $T_{90}$ (minutes:seconds) | 15.21 | 15.2 | 13.2 | 14.2 | 13.43 |
| Minimum torque (lbf-in) | 4.3 | 4.5 | 5.8 | 5.3 | 6.0 |
| Maximum torque (lbf-in) | 37.2 | 33.7 | 35.7 | 36 | 36.7 |

The data in Table II shows the influence of a devulcanized EPDM spark plug boot cover compound prepared by TRC, Industries and a chemically devulcanized scrap EPDM membrane provided by ADMARK, Wilmington, N.C. on the cure rate of an EPDM pipe boot flashing compound. At the 15 part level, the devulcanized spark plug boot cover had essentially no influence on the cure rate of the pipe boot flashing compound. On the other hand, the samples of chemically devulcanized scrap EPDM membrane slightly accelerated the rate of cure of the pipe boot flashing compound shown in Table II. Maximum torque, which is an indicator of state of cure at 160° C., did not appear to show any revealing differences between the four experimental compounds and the control EPDM compound.

Pursuant to ASTM D 1646, Mooney Scorch at 135° C. was determined using a shearing disc viscometer for measuring both Mooney Viscosity an processing safety. This method can be employed to determine incipient cure time and the rate of cure during the very early stages of vulcanization. The results of such tests are listed in Table III hereinbelow.

TABLE III

Mooney Scorch (135° C.) - large rotor (1.5 - inch diameter)

| | Compound Nos. | | | | |
|---|---|---|---|---|---|
| | Control | 1 | 2 | 3 | 4 |
| Minimum Viscosity (Mu) | 24.3 | 29 | 30.9 | 30.8 | 32 |
| $T_5$ (minutes:seconds) | 15.6 | 17 | 13.5 | 12.4 | 10.76 |
| $T_{35}$ (minutes:seconds) | 23.4 | 25.2 | 21.3 | 19.9 | 17.6 |

Like the rheometer data in Table II, the data in Table III confirms that the chemically devulcanized scrap EPDM does accelerate cure, while the EPDM spark plug boot cover compound, which was devulcanized without the use of chemicals or other reclaiming agents, had essentially no influence on processing safety (time to five and thirty-five point rise) at 135° C. Testing was performed using a Monsanto Viscometer 2000E with a large (1.5-inch diameter) rotor.

The stress-strain properties of the EPDM pipe boot flashing were tested in accordance with ASTM D 412 (Method A, Dumbbell and Straight). Dumbbell-shaped specimens were cut using the appropriate metal (die C) from individually cured 45 mil, 6×6 inch flat rubber slats that were compression molded for 40 minutes at 160° C. Modulus, tensile strength and elongation at break measurements were obtained on both unaged and heat aged—28 days at 116° C.—dumbbell-shaped test specimens using a table model Instron® Tester, Model 4301. The heat aged test specimens were taken from cured slabs that were aged in a forced air oven for 28 days at 116° C. in accordance with ASTM D 573. Heat aging is an accelerated aging test designed to determine the effect of heat on the thermostability of the sulfur crosslinks formed during actual vulcanization. All dumbbell-shaped specimens, either unaged or heat aged, were allowed to set for about 24 hours before testing was carried out at 23° C. The Instron® Tester, which is a testing machine of the constant rate-of-jaw separation, is equipped with suitable grips capable of clamping the dumbbell-shaped test specimens without slippage.

Tear properties were determined by using a metal die, which was a 90° angle die C, to remove the test specimens from cured 45 mil, 6×6 inch flat rubber slabs, which were compression molded 40 minutes at 160° C. in accordance with ASTM D 624. All die C tear specimens, both unaged and heat aged were allowed to set for about 24 hours, before testing was carried out at 23° C. Tear properties, which are measured in lbs/inch, were reported using a table model Instron® Tester, Model 4301, and the test results were calculated in accordance with ASTM D 624.

Trouser tear properties were measured using test specimens, which were 1×3 inches, that were prepared in accordance with the International Standard Organization (ISO) 34, First Edition, 1979. Tear properties, which are measured in lbs/inch, were determined at 23° C. using a table model Instron® Tester, Model 4301, and the test results were calculated in accordance with ISO 34.

Shore "A" hardness, which measures the hardness of the cured membrane, was conducted at 23° C. in accordance with ASTM D 2240. The cured test specimens were allowed to set for 24 hours prior to testing.

The stress-strain properties of the rubber slabs, which were heat cured for about 40 minutes at about 160° C., but unaged, are identified in Table IV hereinbelow.

TABLE IV

Unaged Stress-Strain Properties (23° C.)

| | Compound Nos. | | | | |
|---|---|---|---|---|---|
| | Control | 1 | 2 | 3 | 4 |
| 100% Modulus (psi) | 370 | 335 | 355 | 340 | 320 |
| Tensile at break (psi) | 1715 | 1585 | 1495 | 1465 | 1435 |
| Elongation at break (%) | 525 | 545 | 495 | 505 | 515 |
| Die C Tear Properties, (lbs./inch) | 210 | 203 | 207 | 204 | 193 |
| Shore "A" Hardness, (lbs./inch) | 64 | 64 | 64 | 64 | 63 |

The tensile strength of the five EPDM pipe boot flashing compounds, vulcanized at 160° C., show the influence of the devulcanized EPDM spark plug boot cover to be directionally higher than compound No. 2 which contains an equal amount of (fifteen parts) of chemically devulcanized scrap EPDM membrane prepared by ADMARK. Increasing the level of chemically devulcanized scrap EPDM membrane from 15 to 40 parts had essentially no influence on elongation at break, die C tear properties and cured compound hardness. Unaged stress-strain properties, die C tear properties and cured compound hardness are listed in Table IV.

Similar stress-strain tests at 23° C. were performed on a rubber sheet material that was likewise cured for about 40 minutes at about 160° C., but then subjected to heat aging for 28 days at 116° C. The results of these tests after heat aging 28 days at 116° C. are described in Table V.

TABLE V

Heat Aged Stress-Strain Properties (23° C.) - Aged 28 days at 116° C.

| | Compound Nos. | | | | |
|---|---|---|---|---|---|
| | Control | 1 | 2 | 3 | 4 |
| 100% Modulus (psi) | 605 | 550 | 545 | 545 | 520 |
| Tensile at break (psi) | 1640 | 1575 | 1498 | 1525 | 1482 |
| Elongation at break (%) | 315 | 345 | 315 | 295 | 330 |
| Die C Tear Properties, (lbs./inch) | 175 | 179 | 177 | 175 | 172 |
| Shore "A" Hardness, (lbs./inch) | 72 | 70 | 70 | 70 | 69 |

Compared to the devulcanized scrap EPDM membrane free control, the tensile strength of the four experimental compounds (1–4) were slightly poorer than the control shown in Table V. However, differences in elongation at break, die C tear properties and cured compound hardness were comparable between the four experimental compounds and the control compound.

EXAMPLE II

In a manner similar to that described in Example I, an additional four EPDM compositions were Brabender mixed and formed into a rubber sheeting using a 75° C. two-roll mill. The EPDM pipe boot flashing compositions are listed in Table VI, hereinbelow. Compound Nos. 5–7 are representative of compositions of the present invention.

TABLE VI

| | Compound Nos. | | | |
|---|---|---|---|---|
| | Control II | 5 | 6 | 7 |
| Virgin EPDM[a] | 85 | 85 | 85 | 85 |
| Virgin EPDM[b] | 15 | 8.1 | 8.5 | 8.4 |
| Devulcanized EPDM[c] | | 20 | | |
| Devulcanized EPDM[d] | | | 20 | |
| Devulcanized EPDM[e] | | | | 20 |
| Parts by Weight Polymer | 100 | 100 | 100 | 100 |
| Carbon Black | 110 | 102.6 | 102.2 | 102.7 |
| Processing Oil | 84 | 80.1 | 80.1 | 79.7 |
| HiWhite R Clay | 12.5 | 10.7 | 10.7 | 10.7 |
| Zinc Oxide | 5 | 5 | 5 | 5 |
| Stearic acid | 1 | 1 | 1 | 1 |
| Masterbatch | 312.5 | 312.5 | 312.5 | 312.5 |
| Sulfur Curing Ingredients | 3.55 | 3.55 | 3.55 | 3.55 |
| TOTAL | 316.05 | 316.05 | 316.05 | 316.05 |

[a]Amorphous EPDM
[b]Semi-crystalline EPDM
[c]Devulcanized Scrap EPDM Membrane (crumb form) - (38% of sulfur crosslinks broken)
[d]Devulcanized Scrap EPDM Membrane (crumb form) - (50–55% of sulfur crosslinks broken)
[e]Devulcanized Scrap EPDM Membrane (crumb form) - (72% of sulfur crosslinks broken)

Tables VII–X, hereinbelow, contain test data on the EPDM pipe boot flashing compositions of Table VI hereinabove. The EPDM compositions, listed in Table VI, all contain one hundred parts of polymer (sum of virgin EPDM plus EPDM in the devulcanized scrap EPDM membrane). The physical tests were identically performed to those in Example I and, accordingly, reference can be made to Example I for specific details of the tests.

TABLE VII

Rheometer at 160° C. mini-die, 3° Arc

| | Compound Nos. | | | |
|---|---|---|---|---|
| | Control II | 5 | 6 | 7 |
| Scorch Time (minutes:seconds) | 4:07 | 3:56 | 4:10 | 4:09 |
| $T_{50}$ (minutes:seconds) | 6:56 | 6:34 | 7:01 | 7:04 |
| $T_{90}$ (minutes:seconds) | 15:00 | 15:25 | 15:21 | 15:21 |
| Minimum torque (lbf-in) | 4.11 | 4.24 | 4.44 | 4.63 |
| Maximum torque (lbf-in) | 33.2 | 33.4 | 34 | 34.5 |

TABLE VIII

Mooney Scorch at 135° C. - large rotor

| | Compound Nos. | | | |
|---|---|---|---|---|
| | Control II | 5 | 6 | 7 |
| Minimum Viscosity (Mu) | 24 | 23.7 | 54.8 | 24.9 |
| $T_5$ (minutes:seconds) | 12.9 | 12.2 | 13.9 | 13.4 |
| $T_{35}$ (minutes:seconds) | 20.9 | 20.4 | 21.7 | 21.2 |

TABLE IX

| | Compound Nos. | | | |
|---|---|---|---|---|
| | Control II | 5 | 6 | 7 |
| Unaged Stress-Strain Properties (23° C.) | | | | |
| 100% Modulus (psi) | 380 | 365 | 360 | 360 |
| 300% Modulus (psi) | 1055 | 1055 | 1085 | 1050 |
| Tensile at break (psi) | 1585 | 1360 | 1345 | 1355 |
| Elongation at break (%) | 500 | 440 | 385 | 370 |
| Die C Tear Properties (lbs/inch) | 199 | 193 | 193 | 204 |
| Trouser Tear at 23° C. | | | | |
| Machine Direction (lbs/inch) | 141 | 133 | 123 | 121 |
| Type of tear pattern | hook tear | hook tear | hook tear | hook tear |
| Cross Direction (lbs/inch) | 123 | 152 | 134 | 145 |
| Type of tear pattern | hook tear | hook tear | hook tear | hook tear |

The results in Table VII implies that compounds containing devulcanized scrap EPDM membrane featuring anywhere from about 38 to about 72 percent of the sulfur crosslinks broken developed cure rates which were virtually identical the control compound. The number of broken sulfur crosslinks in the devulcanized scrap EPDM membrane ( Devulcanized EPDM—Samples C–E) did not appear to have a significant influence on the cure characteristics of compound Nos. 5–7. The cure characteristics were essentially the same regardless of the amount of sulfur crosslinks broken by the proprietary process developed by TRC Industries.

Compound viscosity and processing safety are reported in Table VIII, hereinabove. Again, the number of sulfur crosslinks broken in Samples C through E did not have an adverse effect on compound viscosity and scorch or processing safety.

In Table IX, the tensile strength of compound Nos. 5 through 7 which featured 20 parts each of devulcanized scrap EPDM membrane, were very similar, regardless of the number of sulfur crosslinks broken. The results of both tear test (die C and trouser tear) were comparable to the control (II) compound.

TABLE X

| | Compound Nos. | | | |
|---|---|---|---|---|
| | Control II | 5 | 6 | 7 |
| Heat Aged Stress-Strain Properties (23° C.) - Heat Aged 28 days at 116° C. | | | | |
| 100% Modulus (psi) | 670 | 610 | 650 | 645 |
| Tensile at break (psi) | 1495 | 1505 | 1380 | 1520 |
| Elongation at break (%) | 270 | 285 | 245 | 270 |
| Die C Tear Properties (lbs/inch) | 186 | 183 | 190 | 186 |
| Trouser Tear at 23° C. | | | | |
| Machine Direction (lbs/inch) | 68 | 57 | 70 | 60 |
| Type of tear pattern | hook tear | diagonal tear | hook tear | diagonal tear |
| Cross Direction (lbs/inch) | 45 | 71 | 58 | 56 |
| Type of tear pattern | diagonal tear | hook tear | hook/ diagonal tear | diagonal tear |

In each test situation shown in Table X involving the three compounds with 20 parts each the devulcanized scrap EPDM membrane, the test results were about equal to the control compound. Also, the type of tear patters were very similar between the experimental compounds and the control (II) compound.

EXAMPLE III

In a similar manner to that described in Example I, an additional four EPDM pipe boot flashing compositions were mixed in the Brabender mixer and resheeted to the proper thickness using a 75° C. two-roll mill. The formulae for these compositions are listed on Table XI, hereinbelow. Except for the source of EPDM, the types and amounts of ingredients are identical in each of the four formulae provided in Table XI. Compound Nos. 8–10 are representative of compositions of the present invention.

TABLE XI

| | Compound Nos. | | | |
|---|---|---|---|---|
| | Control III | 8 | 9 | 10 |
| Virgin EPDM[a] | 85 | 85 | 85 | 85 |
| Virgin EPDM[b] | 15 | 9.5 | 5.82 | 0.32 |
| Devulcanized EPDM[c] | 0 | 15 | 25 | 40 |
| Parts by Weight Rubber | 100 | 100 | 100 | 100 |
| Carbon Black | 110 | 104.9 | 101 | 96 |
| Processing Oil | 80 | 76.8 | 74.7 | 71.6 |
| Zinc Oxide | 5 | 4.8 | 4.8 | 4.8 |
| Stearic Acid | 1 | 1 | 1 | 1 |
| Sulfur Curing Ingredients | 3.10 | 2.95 | 2.95 | 2.95 |
| TOTAL | 299.1 | 299.95 | 300.27 | 301.67 |

[a]Amorphous EPDM
[b]Semi-crystalline EPDM
[c]0801-0001 (slab form) - Prepared by ADMARK, Wilmington, North Carolina Tables XII–XV, hereinbelow, contain tst data on the EPDM rubber compositions of Table XI hereinabove. These tests were identically performed to those in Example I and, accordingly, reference can be made to Example I for specific details of the tests.

TABLE XII

Rheometer at 160° F. mini-die, 3° Arc

| | Compound Nos. | | | |
|---|---|---|---|---|
| | Control III | 8 | 9 | 10 |
| Scorch Time (minutes:seconds) | 4:24 | 3:57 | 3:53 | 3:29 |
| $T_{50}$ (minutes:seconds) | 7:21 | 6:24 | 6:36 | 5:56 |
| $T_{90}$ (minutes:seconds) | 15:21 | 13:12 | 14:20 | 13:46 |
| Minimum torque (lbf-in) | 4.3 | 5.8 | 5.3 | 5.96 |
| Maximum torque (lbf-in) | 37.2 | 35.7 | 36 | 36.7 |

In Table XII, Compound Nos. 8–10 containing different levels of the chemically devulcanized scrap EPDM membrane were faster curing than the control compound, while the state of cure for each of the three experimental EPDM compounds was about the same, relative to the control (III) compound.

TABLE XIII

Mooney Scorch at 135° C.

| | Compound Nos. | | | |
|---|---|---|---|---|
| | Control III | 8 | 9 | 10 |
| Minimum Viscosity (Mu) | 39.6 | 30.9 | 30.8 | 32 |
| $T_5$ (minutes:seconds) | 14.6 | 13.5 | 12.4 | 10.7 |
| $T_{35}$ (minutes:seconds) | 22.4 | 21.3 | 19.9 | 17.6 |

1. In Table XIII, the viscosity of the three experimental compounds with devulcanized scrap EPDM rubber were lower, but faster curing, in comparison to the (III) control compound.

TABLE XIV

| | Compound Nos. | | | |
|---|---|---|---|---|
| | Control III | 8 | 9 | 10 |
| Unaged Stress-Strain Properties at 23° C. | | | | |
| 100% Modulus (psi) | 370 | 355 | 340 | 320 |
| 300% Modulus (psi) | 1075 | 975 | 925 | 920 |
| Tensile at break (psi) | 1715 | 1495 | 1465 | 1425 |
| Elongation at break (%) | 525 | 495 | 507 | 504 |
| Die C Tear Properties (lbs/inch) | 210 | 207 | 204 | 193 |
| Shore "A" Hardness | 64 | 64 | 64 | 63 |

TABLE XIV-continued

| | Compound Nos. | | | |
|---|---|---|---|---|
| | Control III | 8 | 9 | 10 |
| Unaged Trouser Tear at 23° C. | | | | |
| Machine Direction (lbs/inch) | 134 | 132 | 140 | 137 |
| Type of tear pattern | hook tear | hook tear | hook tear | hook tear |
| Cross Direction (lbs/inch) | 131 | 134 | 150 | 133 |
| Type of tear pattern | hook tear | hook tear | hook tear | hook tear |

TABLE XV

| | Compound Nos. | | | |
|---|---|---|---|---|
| | Control III | 8 | 9 | 10 |
| Heat Aged Stress-Strain Properties at 23° C. - Heat Aged 28 days at 116° C. | | | | |
| 100% Modulus (psi) | 605 | 545 | 545 | 320 |
| Tensile at break (psi) | 1640 | 1498 | 1525 | 1485 |
| Retention (%) | 95.6 | 100.2 | 104.1 | 104.2 |
| Elongation at break (%) | 317 | 315 | 295 | 330 |
| Retention (%) | 60.4 | 63.6 | 58.2 | 65.5 |
| Die C Tear Properties (lbs/inch) | 175 | 177 | 175 | 172 |
| Shore "A" Hardness | 72 | 70 | 70 | 69 |
| Heat Aged Trouser Tear at 23° C. | | | | |
| Machine Direction (lbs/inch) | 62 | 70 | 82 | 81 |
| Type of tear pattern | diagonal tear | diagonal tear | hook tear | hook tear |
| Cross Direction (lbs/inch) | 77 | 88 | 80 | 72 |
| Type of tear pattern | diagonal tear | hook tear | diagonal tear | diagonal tear |

Numerous unaged and heat aged physical properties are shown in Tables XIV and XV, respectively. Relative to the control (III) compound, the three experimental EPDM compounds (Nos. 8–10) showed excellent retention of both tensile strength and ultimate elongation after heat aging 28 days at 116° C.

Percent retention is determined as follows:

$$\frac{\text{heat aged physical property}}{\text{unaged physical property}} \times 100 = \text{Percent Retention}$$

Both die C and trouser tear resistance for the three experimental EPDM compounds were comparable to the control (III) compound.

TABLE XVI

| | Compound Nos. | | | | | | |
|---|---|---|---|---|---|---|---|
| | Control IV | 11 | 12 | 13 | 14 | 15 | 16 |
| Compound Nos. | | | | | | | |
| Virgin EPDM[a] | 100 | 85 | 70 | 55 | 40 | 25 | 10 |
| Devulcanized EPDM[b] | 0 | 43.48 | 86.96 | 130.44 | 173.92 | 217.4 | 260.88 |
| Parts by Weight Rubber | 100 | 100 | 100 | 100 | 100 | 100 | 100 |
| Carbon Black | 110 | 93.96 | 77.91 | 61.87 | 45.82 | 29.78 | 13.74 |
| Coal Filler | 16.82 | 16.82 | 16.82 | 16.82 | 16.82 | 16.82 | 16.82 |
| Processing Oil | 80 | 71.45 | 62.87 | 54.3 | 45.74 | 37.17 | 28.61 |
| HiWhite R Clay | 27.2 | 23.31 | 19.46 | 15.59 | 11.72 | 7.85 | 3.97 |
| Zinc Oxide | 2.25 | 2.25 | 2.25 | 2.25 | 2.25 | 2.25 | 2.25 |
| Stearic acid | 1.5 | 1.5 | 1.5 | 1.5 | 1.5 | 1.5 | 1.5 |
| Masterbatch | 337.77 | 337.77 | 337.77 | 337.77 | 337.77 | 337.77 | 337.77 |
| Sulfur Curing Ingredients | 3.65 | 3.65 | 3.65 | 3.65 | 3.65 | 3.65 | 3.65 |
| TOTAL | 341.42 | 341.42 | 341.42 | 341.42 | 341.42 | 341.42 | 341.42 |

[a] Amorphous EPDM
[b] Devulcanized Scrap EPDM Membrane (crumb form) - (38% of sulfur crosslinks broken) - Prepared by TRC Industries, Inc.

Tables XVI–XX hereinbelow, contain unaged and heat aged data involving EPDM roof sheeting compositions (Compound Nos. 11–16). The physical properties were identically performed to those in Example I and, accordingly, reference can be made to Example I for specific details of the tests. The EPDM compositions listed in Table XVI, all contain one hundred parts of EPDM polymer (sum of virgin EPDM plus EPDM present in the devulcanized scrap EPDM membrane). Except for the source of EPDM, the types and amounts of ingredients are identical in each of the seven EPDM formulae listed in Table XVI. Compound Nos. 11–16 are representative of compositions of the present invention.

TABLE XVII

Rheometer at 160° C., mini-die, 3° Arc

| | Compound Nos. | | | | | | |
|---|---|---|---|---|---|---|---|
| | Control IV | 11 | 12 | 13 | 14 | 15 | 16 |
| Scorch Time (minutes:seconds) | 5:24 | 6:23 | 5:46 | 7:23 | 7:45 | 8:33 | 8:33 |
| $T_{50}$ (minutes:seconds) | 11:01 | 12:02 | 11:19 | 13:12 | 13:24 | 13:46 | 12:51 |
| $T_{90}$ (minutes:seconds) | 22:54 | 23:00 | 22:02 | 23:21 | 23:25 | 23:40 | 23:23 |
| Minimum torque (lbf-in) | 6.02 | 6.67 | 8.20 | 10.70 | 11.30 | 11.90 | 13.40 |
| Maximum torque (lbf-in) | 42.90 | 41.80 | 44.20 | 37.90 | 36.40 | 32.40 | 29.10 |

TABLE XVIII

Mooney Scorch at 135° C. - large rotor

| | Compound Nos. | | | | | | |
|---|---|---|---|---|---|---|---|
| | Control IV | 11 | 12 | 13 | 14 | 15 | 16 |
| Minimum Viscosity (Mu) | 37.7 | 37.4 | 43.5 | 51.9 | 53.3 | 55.9 | 62.8 |
| $T_5$ (minutes:seconds) | 19.6 | 24.9 | 21.3 | 30.2 | 31.5 | 33.7 | 27.1 |
| $T_{35}$ (minutes:seconds) | 36.6 | 42 | 35.3 | 46.1 | 46.9 | 52.4 | 53.9 |

The data in Tables XVI and XVII confirmed that as the level of devulcanized scrap EPDM membrane is increased, the cure rates are longer, compound viscosity increases and the scorch or processing safety is longer based on Mooney Scorch data.

TABLE XIX

Unaged Stress-Strain Properties at 23° C.

| | Compound Nos. | | | | | | |
|---|---|---|---|---|---|---|---|
| | Control IV | 11 | 12 | 13 | 14 | 15 | 16 |
| 100% Modulus (psi) | 430 | 420 | 495 | 370 | 390 | 370 | 325 |
| 300% Modulus (psi) | 1070 | 1013 | 1155 | 950 | 965 | 0 | 0 |
| Tensile at break (psi) | 1425 | 1150 | 1185 | 985 | 950 | 855 | 680 |
| Elongation at break (%) | 477 | 380 | 320 | 320 | 285 | 255 | 220 |
| Die C Tear Properties (lbs/inch) | 242 | 222 | 212 | 175 | 156 | 140 | 116 |
| Shore "A" hardness | 66 | 67 | 69 | 67 | 64 | 63 | 61 |

TABLE XX

Heat Aged Stress-Strain Properties at 23° C. - Heat Aged 28 Days at 116° C.

| | Compound Nos. | | | | | | |
|---|---|---|---|---|---|---|---|
| | Control IV | 11 | 12 | 13 | 14 | 15 | 16 |
| 100% Modulus (psi) | 820 | 740 | 770 | 675 | 680 | 550 | 565 |
| 300% Modulus (psi) | 1630 | 0 | 0 | 0 | 0 | 0 | 0 |
| Tensile at break (psi) | 1770 | 1455 | 1335 | 1175 | 1115 | 965 | 815 |
| Retention (%) | 124.2 | 126.5 | 112.7 | 119.3 | 117.4 | 112.9 | 119.9 |
| Elongation at break (%) | 350 | 295 | 240 | 225 | 205 | 195 | 160 |
| Retention (%) | 73.4 | 77.6 | 75.0 | 70.3 | 71.9 | 76.5 | 72.7 |
| Die C Tear Properties (lbf-in) | 259 | 238 | 220 | 195 | 160 | 159 | 118 |
| Retention (%) | 107.0 | 107.2 | 103.8 | 111.4 | 102.6 | 113.6 | 101.7 |
| Shore "A" Hardness | 71 | 72 | 70 | 70 | 70 | 68 | 66 |

A variety of unaged and heat aged physical properties are shown in Tables XIX and XX, respectively. Relative to the control (IV) compound, the six experimental EPDM compounds (Nos. 11–16) showed very good retention of both tensile strength and ultimate elongation as well as die C tear resistance after heat aging 28 days at 116° C.

EXAMPLE V

Tables XXII–XXV hereinbelow, contain unaged and heat aged physical testing data including EPDM roof sheeting compositions (Compound Nos. 17–21). The physical property determinations were identically performed to those in Example I and, accordingly, reference can be made to Example I for specific details of the tests. The EPDM compositions listed in Table XXI all contain one hundred parts of EPDM polymer (sum of virgin EPDM plus EPDM present in the devulcanized scrap EPDM membrane). Except for the source of EPDM, the types and amounts of ingredients are identical in each of the seven EPDM formulae provided in Table XXI.

Compound Nos. 17–21 are representative of compositions of the present invention.

TABLE XXI

| | Compound Nos. | | | | | |
|---|---|---|---|---|---|---|
| | Control V | 17 | 18 | 19 | 20 | 21 |
| Virgin EPDM[a] | 100 | 85 | 70 | 55 | 40 | 25 |
| Devulcanized EPDM[b] | 0 | 45.18 | 90.37 | 135.55 | 180.73 | 225.91 |
| Parts by Weight Rubber | 100 | 100 | 100 | 100 | 100 | 100 |
| Carbon Black | 110 | 93.51 | 77.02 | 60.52 | 44.03 | 27.54 |
| Coal Filler | 16.82 | 16.82 | 16.82 | 16.82 | 16.82 | 16.82 |
| Processing Oil | 80 | 70.33 | 60.66 | 50.99 | 41.32 | 31.66 |
| HiWhite R Clay | 27.2 | 23.18 | 19.16 | 15.14 | 11.12 | 7.09 |
| Zinc Oxide | 2.25 | 2.25 | 2.25 | 2.25 | 2.25 | 2.25 |
| Stearic acid | 1.5 | 1.5 | 1.5 | 1.5 | 1.5 | 1.5 |
| Masterbatch | 337.77 | 337.77 | 337.77 | 337.77 | 337.77 | 337.77 |
| Sulfur Curing Ingredients | 3.65 | 3.65 | 3.65 | 3.65 | 3.65 | 3.65 |
| TOTAL | 341.42 | 341.42 | 341.43 | 341.42 | 341.42 | 341.42 |

[a]Amorphous EPDM
[b]Devulcanized Scrap EPDM Membrane (crumb form) - (72% of sulfur crosslinks broken) - Prepared by TRC Industries, Inc.

TABLE XXII

Rheometer at 160° C., mini-die, 3° Arc

| | Compound Nos. | | | | | |
|---|---|---|---|---|---|---|
| | Control V | 17 | 18 | 19 | 20 | 21 |
| Scorch Time (minutes) | 5:24 | 6:35 | 6:40 | 7:11 | 7:34 | 8:33 |
| $T_{50}$ (minutes:seconds) | 11:01 | 12:27 | 12:38 | 13:00 | 12:32 | 13:46 |
| $T_{90}$ (minutes:seconds) | 22:54 | 22:28 | 23:23 | 24:10 | 23:51 | 23:40 |
| Minimum torque (lbf-in) | 6.0 | 7.8 | 10.0 | 16.7 | 16.1 | 11.90 |
| Maximum torque (lbf-in) | 42.9 | 42.9 | 42.1 | 40.8 | 35.7 | 32.40 |

TABLE XXIII

Mooney Scorch at 135° C. - large rotor

| | Compound Nos. | | | | | |
|---|---|---|---|---|---|---|
| | Control V | 17 | 18 | 19 | 20 | 21 |
| Minimum Viscosity (Mu) | 37.7 | 38.2 | 47.8 | 69.9 | 78 | 61.1 |
| $T_5$ (minutes:seconds) | 19.6 | 27.1 | 26.7 | 27.1 | 32.4 | 38 |
| $T_{35}$ (minutes:seconds) | 36.6 | 44.4 | 43.2 | 41.2 | 47 | 57.2 |

The rheometer and Mooney Scorch data shown in Tables XXII and XXIII, respectively, confirms that as the amount of devulcanized scrap EPDM membrane is increased, the cure rates are longer, compound viscosity increases and the scorch or processing safety is longer based on Mooney Scorch data.

TABLE XXIV

Unaged Stress-Strain Properties at 23° C.

| | Compound Nos. | | | | | |
|---|---|---|---|---|---|---|
| | Control V | 17 | 18 | 19 | 20 | 21 |
| 100% Modulus (psi) | 430 | 350 | 360 | 405 | 420 | 435 |
| 300% Modulus (psi) | 1070 | 950 | 960 | 1105 | 0 | 0 |
| Tensile at break (psi) | 1425 | 1185 | 1125 | 1110 | 1070 | 1070 |
| Elongation at break (%) | 477 | 432 | 380 | 305 | 275 | 255 |
| Die C Tear Properties (lbs/inch) | 242 | 231 | 198 | 185 | 173 | 146 |
| Shore "A" Hardness | 66 | 59 | 61 | 62 | 62 | 63 |

TABLE XXV

Heat Aged Stress-Strain Properties at 23 ° C. - Heat Aged 28 Days at 116° C.

| | Compound Nos. | | | | | |
|---|---|---|---|---|---|---|
| | Control V | 17 | 18 | 19 | 20 | 21 |
| 100% Modulus (psi) | 820 | 745 | 695 | 730 | 720 | 730 |
| Tensile at break (psi) | 1770 | 1275 | 1345 | 1295 | 1245 | 1280 |
| Retention (%) | 124.2 | 107.6 | 119.6 | 116.7 | 116.4 | 119.6 |
| Elongation at break (%) | 350 | 225 | 260 | 220 | 210 | 210 |
| Retention (%) | 73.4 | 52.1 | 68.4 | 72.1 | 76.4 | 82.4 |
| Die C Tear Properties (lbs/inch) | 259 | 204 | 199 | 182 | 187 | 165 |
| Retention (%) | 107.0 | 88.3 | 100.5 | 98.4 | 108.1 | 113.0 |
| Shore "A" Hardness | 71 | 70 | 70 | 70 | 70 | 70 |

Unaged and heat aged stress-strain, die C tear and cured compound hardness results are provided in Tables XXIV and XXV, respectively. The five experimental EPDM compounds (Nos. 17–21) showed very good retention of tensile strength, ultimate elongation and die C tear properties. Aged compound hardness values were comparable between the five experimental EPDM compounds and the control (V) compound.

Thus, it should be evident that the method of the present invention is useful for recycling EPDM rubber. The invention is particularly suited for incorporating devulcanized scrap EPDM rubber into EPDM compositions that are useful for developing roof sheeting membrane materials, but is not necessarily limited thereto. For example, the compositions described herein are useful for EPDM flashing, especially pipe boot flashing, and sundry roof accessories.

Based upon the foregoing disclosure, it should now be apparent that the use of the devulcanized EPDM rubber within the compositions described herein will carry out the objects set forth hereinabove. It is, therefore, to be understood that any variations evident fall within the scope of the claimed invention and thus, the selection of specific component elements can be determined without departing from the spirit of the invention herein disclosed and described. In particular, devulcanized EPDM rubber can be added to other compositions including other substituents typically found within roofing membrane compositions. Thus, the scope of the invention shall include all modifications and variations that may fall within the scope of the attached claims.

What is claimed is:
1. A method of recycling EPDM rubber comprising the steps of:
devulcanizing previously cured EPDM rubber using mechanical treatment in the absence of chemical additives; and
adding the devulcanized EPDM rubber to a composition for forming an elastomeric EPDM-based membrane for roofing such that said resultant membrane composition comprises:
an EPDM rubber mixture including
from about 50 to about 95 parts by weight virgin EPDM rubber, and
from about 5 to about 50 parts by weight of the devulcanized EPDM rubber, to total one hundred parts by weight rubber, as the total polymeric component of the composition,
from about 75 to about 300 parts by weight phr of a filler, and
from about 35 to about 135 parts by weight phr of a processing oil, and a cure package, wherein the EPDM-based membrane has an unaged tensile at break of between 680 and 1585 p.s.i. and, demonstrates at least about 90 percent retention in tensile strength after about twenty eight days of heat aging at about 116 degrees Celsius.

2. A method of recycling EPDM rubber, as set forth in claim 1, wherein the filler comprises carbon black and at least one mineral filler.

3. A method of recycling EPDM rubber, as set forth in claim 2, wherein the mineral filler includes fillers selected from the group consisting of hard clays, soft clays, chemically modified clays, mica, talc, calcium carbonate, titanium dioxide, amorphous precipitated hydrated silica and mixtures thereof.

4. A method of recycling EPDM rubber, as set forth in claim 1, wherein the filler includes cryogenically ground rubber.

5. A method of recycling EPDM rubber, as set forth in claim 1, wherein the processing oil is selected from the group consisting of paraffinic oils, naphthenic oils, and mixtures thereof.

6. A method of recycling EPDM rubber, as set forth in claim 1, wherein the cure package is selected from the group consisting of sulfur, a sulfur-donor cure system, a peroxide cure system, a quinone-type cure system, and mixtures thereof.

7. A method of recycling EPDM rubber, as set forth in claim 1, wherein the cure package further includes at least one accelerator.

8. A method of recycling EPDM rubber, as set forth in claim 1, at least one accelerator is a sulfur curing accelerator.

9. A method of recycling EPDM rubber, as set forth in claim 1, wherein the rubber mixture includes from about 70 to about 95 parts by weight of the virgin EPDM rubber and from about 30 to about 5 parts by weight of the devulcanized EPDM rubber, to total one hundred parts by weight rubber.

10. A method of recycling EPDM rubber, as set forth in claim 9, wherein the rubber mixture includes from about 80 to about 95 parts by weight of the virgin EPDM rubber and from about 20 to about 5 parts by weight of the devulcanized EPDM rubber, to total one hundred parts by weight rubber.

11. A method of recycling EPDM rubber comprising the steps of:

devulcanizing EPDM rubber via mechanical treatment in the absence of chemical additives; and incorporating the devulcanized EPDM rubber into a composition for forming an EPDM rubber sheet material for roofing having only EPDM as the polymeric component of the composition and having an unaged tensile at break between 680 and 1585 p.s.i., wherein the EPDM rubber sheet material demonstrates at least about 90 percent retention in tensile strength after about twenty eight days of heat aging at about 116 degrees Celsius.

12. A method of recycling EPDM rubber, as set forth in claim 11, wherein said of incorporating the devulcanized EPDM rubber includes forming a rubber mixture comprising the devulcanized EPDM rubber and a virgin EPDM rubber.

13. A method of recycling EPDM rubber, as set forth in claim 12, where the rubber mixture includes from about 70 to about 95 parts by weight of the virgin EPDM rubber and from about 30 to about 5 parts by weight of the devulcanized EPDM rubber, to total one hundred parts by weight rubber.

14. A roof membrane comprising:

a rubber mixture including from about 50 to about 95 parts by weight virgin EPDM rubber, and from about 5 to about 50 parts by weight of a devulcanized EPDM rubber, to total 100 parts by weight rubber, wherein the devulcanized EPDM rubber is devulcanized by mechanical means without the use of chemical additives, and wherein EPDM rubber is the only polymeric component of the composition;

from about 75 to about 300 parts by weight phr of a filler, from about 35 to about 135 parts by weight phr of a processing oil, and a cure package, wherein the EPDM-based membrane has an unaged tensile at break of between 680 and 1585 p.s.i. and demonstrates at least about 90 percent retention in tensile strength after about twenty eight days of heat aging at about 116 degrees Celsius.

15. A roof membrane, as set forth in claim 14, wherein said rubber mixture includes from about 70 to about 95 parts by weight of the virgin EPDM rubber and from about 30 to about 5 parts by weight of the devulcanized EPDM rubber, to total one hundred parts by weight rubber.

16. A roof membrane, as set forth in claim 14, wherein said rubber mixture includes from about 80 to about 95 parts by weight of the virgin EPDM rubber and from about 20 to about 5 parts by weight of the devulcanized EPDM rubber, to total one hundred parts by weight rubber.

17. A roof membrane, as set forth in claim 14, wherein said cure package is selected from the group consisting of sulfur, a sulfur-donor cure system, a peroxide cure system, a quinone-type cure system, and mixtures thereof.

18. A roof membrane, as set forth in claim 14, wherein said cure package further includes at least one accelerator.

19. A roof membrane, as set forth in claim 14, at least one accelerator is a sulfur curing accelerator.

20. A roof membrane, as set forth in claim 14, wherein said accelerator is selected from the group consisting of benzothiazole sulfenamides, dithiocarbamates, thiazoles, and mixtures thereof.

21. A roof membrane, as set forth in claim 14, wherein the roof sheeting membrane demonstrates at least about 90 percent retention in die C tear resistance after about twenty eight days of heat aging at about 116° C.

22. A roof membrane, as set forth in claim 14, wherein the roof sheeting membrane demonstrates at least about 70 percent retention in elongation after about twenty eight days of heat aging at about 116° C.

23. A method of recycling EPDM rubber, as set forth in claim 1, wherein the virgin EPDM rubber is amorphous.

24. A method of recycling EPDM rubber, as set forth in claim 12, wherein the virgin EPDM rubber is amorphous.

25. A roof membrane, as set forth in claim 14, wherein the virgin EPDM rubber is amorphous.

* * * * *